United States Patent
Priyanto et al.

(10) Patent No.: US 11,576,008 B2
(45) Date of Patent: Feb. 7, 2023

(54) ON DEMAND POSITIONING IN A WIRELESS COMMUNICATION SYSTEM

(71) Applicant: Sony Group Corporation, Tokyo (JP)

(72) Inventors: Basuki Priyanto, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/272,794

(22) PCT Filed: Jul. 21, 2019

(86) PCT No.: PCT/US2019/047476
§ 371 (c)(1),
(2) Date: Mar. 2, 2021

(87) PCT Pub. No.: WO2020/068310
PCT Pub. Date: Apr. 2, 2020

(65) Prior Publication Data
US 2021/0329417 A1   Oct. 21, 2021

(30) Foreign Application Priority Data
Sep. 27, 2018   (SE) .................... 1830266-1

(51) Int. Cl.
*H04W 4/029*   (2018.01)
*G01S 5/06*   (2006.01)
(Continued)

(52) U.S. Cl.
CPC .............. *H04W 4/029* (2018.02); *G01S 5/02* (2013.01); *G01S 5/06* (2013.01); *H04L 5/0048* (2013.01)

(58) Field of Classification Search
CPC ......... H04W 4/029; H04W 64/00; G01S 5/06; G01S 1/20; G01S 5/0009; G01S 5/0018; G01S 5/10; H04L 5/0048; H04B 7/0617
See application file for complete search history.

(56) References Cited

U.S. PATENT DOCUMENTS

2015/0296359 A1   10/2015   Edge
2017/0366244 A1   12/2017   Lee et al.
(Continued)

FOREIGN PATENT DOCUMENTS

WO   2015192113 A1   12/2015
WO   2017164925 A1    9/2017
(Continued)

OTHER PUBLICATIONS

"International Search Report and Written Opinion of the International Searching Authority", International Application No. PCT/US2019/047476, Oct. 29, 2019, 15 pp.
(Continued)

*Primary Examiner* — Kabir A Timory
(74) *Attorney, Agent, or Firm* — Myers Bigel, P.A.

(57) ABSTRACT

A method, performed in a wireless device, for obtaining position information of user equipment, UE, in a wireless communication system is described. The method includes transmitting, to a network, an indication comprising beam information defining beams that are suitable to be used for transmitting Positioning Reference Signals, PRS, to the wireless device, receiving, from the network, control signaling comprising PRS scheduling information for upcoming transmission of the PRS in beams, performing measurements on the PRS based on the PRS scheduling information that was received, and providing the measurements to the network.

20 Claims, 11 Drawing Sheets

(51) Int. Cl.
    *H04L 5/00*      (2006.01)
    *G01S 5/02*      (2010.01)

(56)         References Cited

U.S. PATENT DOCUMENTS

2017/0374637 A1     12/2017    Akkarakaran et al.
2019/0037529 A1*     1/2019    Edge .................... H04W 16/28
2020/0021946 A1*     1/2020    Kumar ................ H04W 72/082

FOREIGN PATENT DOCUMENTS

WO      2017184043 A1     10/2017
WO      2017184865 A1     10/2017
WO      2018149648 A1      8/2018
WO      2018159967 A1      9/2018
WO      2018168670 A1      9/2018

OTHER PUBLICATIONS

"Office Action with Swedish Search Report", SE Patent Application No. 1830266-1, Apr. 23, 2019, 9 pp.

* cited by examiner

ON DEMAND POSITIONING IN A WIRELESS COMMUNICATION SYSTEM

CROSS-REFERENCE TO RELATED APPLICATIONS

The present application is a 35 U.S.C. § 371 national stage application of PCT Application No. PCT/US2019/047476, filed Aug. 21, 2019, which itself claims priority to SE Patent Application No. 1830266-1, filed Sep. 27, 2018, the entire contents of both of which are incorporated herein by reference in their entireties. The above-referenced PCT Application was published in the English language as International Publication No. WO 2020/068310 A1 on Apr. 2, 2020.

FIELD

Various embodiments described herein relate to methods, devices, and computer program products for a wireless communication system, and more particularly to nodes in a wireless communication system.

BACKGROUND

Wireless communication between two devices, such as a network node and a mobile device or user equipment, involves signals that are transmitted between the antennas of the mobile device and the network node. Wireless communication systems may use multiple antenna elements to combine signals into one or more beams. Beams from one or more devices may need to be aligned with one another for proper communication. Beam selection for transmitting signals between the nodes in the wireless network and the mobile device is important for efficient, high quality communication.

SUMMARY

Beam selection is used to select beams from various antennas to transmit signals between the network elements in the wireless network and the mobile devices. Base stations and user equipments (UEs) may be deployed with multiple antenna beam operation. Position reference signals (PRS) may be transmitted using one or more beams of the multibeam operation to determine the position of a UE in a network. However, inefficient use of resources and latency of the PRS transmissions for position determination are of concern in multibeam deployments. For example, base stations may not have synchronization between them for beam sweeps in multibeam deployments. Embodiments described herein improve the use of resources and/or latency in multibeam systems using on-demand position determination of UEs. Specifically, embodiments described herein may resolve issues related to beams received by a UE from multiple base stations at different times and/or frequencies.

Various embodiments of the present invention are directed to a method, performed in a wireless device, for obtaining position information of user equipment, UE, in a wireless communication system. The method includes transmitting, to a network, an indication including beam information defining beams that are suitable to be used for transmitting Positioning Reference Signals, PRS, to the wireless device. The method includes receiving, from the network, control signaling including PRS scheduling information for upcoming transmission of the PRS in beams, performing measurements on the PRS based on the PRS scheduling information that was received, and providing the measurements to the network. The PRS scheduling information may include cell information to use the beam associated with the beam selection. The PRS scheduling information may include a time and/or a frequency to use the beam associated with the beam selection. The PRS scheduling information may include information indicating cells and beams in which PRS is transmitted. The PRS scheduling information may further include a time and/or a frequency in which PRS is transmitted. The PRS may be received from one or more base stations, responsive to a PRS order from a positioning node using a given beam that is suitable to be used for transmitting PRS, at a given time.

According to various embodiments, the performing measurements on the PRS may include performing Observed Time Difference of Arrival, OTDOA, measurements based on the PRS, and communicating Reference Signal Time Different Measurement, RSTD, information based on the OTDOA measurements.

According to various embodiments, the method may include receiving, prior to the transmitting the indication, a positioning request from the network, responsive to a trigger event. Receiving the control signaling may include receiving the PRS scheduling information from a positioning node, using LTE positioning protocol, LPP. The method may include providing an update to a positioning node responsive to determining that the UE position information has changed. The update may include to an update to a cell and/or a beam. The method may include receiving, from the network, additional control signaling including updated PRS scheduling information, responsive to the providing the update. The method may include receiving subsequent PRS on an updated beam associated with the updated PRS scheduling information, and providing updated measurements including an updated UE position information, responsive to the receiving the subsequent PRS signals.

Various embodiments described herein may provide a method by a network for obtaining position information of user equipment, UE, in a wireless communication system. The network may include one or more network nodes such as a positioning node, positioning server, location server, SMLC, e-SMLC, and/or a gNB. The positioning node or positioning server may include an SMLC or an e-SMLC The method includes receiving, from the UE, an indication including beam information defining beams that are suitable to be used for Positioning Reference Signals, PRS, to the UE, transmitting, to the UE, control signaling including PRS scheduling information for upcoming transmission of the PRS based on the received beam information that was received, triggering transmission of the PRS to the UE, and receiving, from the UE, measurements including position information of the UE, based on the PRS scheduling information. The PRS scheduling information may include information indicating one or more cells and one or more beams in which PRS is transmitted. The PRS scheduling information may include a time and/or a frequency to use for the PRS in the one or more cells and the one or more beams. The PRS may be received by a positioning node from a base station, responsive to a PRS order from the positioning node using a given beam that is suitable to be used for transmitting PRS, at a given time.

According to various embodiments, transmitting the control signaling may include transmitting a positioning request to the UE, responsive to an authority request to determine the position of the UE. The method may include transmitting, prior to the transmitting the PRS scheduling information, a positioning request, responsive to a trigger event. Transmitting the control signaling may include transmitting the PRS scheduling information to the UE from a positioning node using LTE positioning protocol, LPP. The method may include receiving an update from a UE, the update including updated information associated with a cell and/or a beam. The method may include transmitting additional control signaling including updated PRS scheduling information, responsive to receiving the update. The method may include transmitting subsequent PRS on an updated beam associated with the updated PRS scheduling information, and receiving updated measurements including an updated UE position information, responsive to the transmitting the subsequent PRS.

According to various embodiments, receiving a positioning request from the network, responsive to the trigger event may include transmitting, from the UE, an indication of an activity for which the UE position information is needed by the network, and receiving the positioning request from the network, responsive to the indication of the activity. Receiving the positioning request from the network, responsive to the trigger event may include receiving the positioning request from the network, responsive to an authority request to the network to determine the position of the UE. Receiving the PRS scheduling information may include receiving the PRS scheduling information directly from a Service Mobile Location Center, SMLC. Receiving the PRS transmission on the beam associated with the beam selection may include receiving the PRS transmission from a base station, responsive to a PRS order from a Service Mobile Location Center, SMLC. The method may include providing a cell update and/or a beam update to a Service Mobile Location Center, SMLC, responsive to determining that the UE position information has changed. The method may include receiving, from the network, updated PRS scheduling information including an updated beam selection and/or updated cell information, responsive to providing the cell update and/or the beam update. The method may include receiving a subsequent PRS transmission on an updated beam associated with the updated beam selection, and/or providing an updated positioning measurement report including an updated UE position information, responsive to the receiving the subsequent PRS transmission.

Various embodiments described herein may provide a method by a network such as an SMLC and/or a gNB for obtaining position information of user equipment, UE, in a wireless communication system. The method includes transmitting a positioning request to the UE, responsive to a trigger event, receiving, from the UE, an indication including beam information, transmitting Positioning Reference Signals, PRS, scheduling information including beam selection, transmitting a PRS transmission on a beam associated with the beam selection, and receiving a positioning measurement report including the position information of the UE, responsive to the PRS transmission. The PRS scheduling information includes cell information to use the beam associated with the beam selection. Transmitting the PRS scheduling information may include transmitting the PRS scheduling information directly to the UE from a Service Mobile Location Center, SMLC. Transmitting the PRS transmission on the beam associated with the beam selection may include transmitting the PRS transmission to the UE, responsive to a PRS order to a gNB from a Service Mobile Location Center, SMLC.

Various embodiments of the present invention are directed to an electronic device used in a wireless communication system, the wireless electronic device including a processor and a memory coupled to the processor, the memory including computer readable program code embodied therein that, when executed by the processor, causes the processor to perform operations including transmitting, to a network, an indication including beam information defining beams that are suitable to be used for transmitting Positioning Reference Signals, PRS, to the wireless device. The method includes receiving, from the network, control signaling including PRS scheduling information for upcoming transmission of the PRS in beams, performing measurements on the PRS based on the PRS scheduling information that was received, and providing the measurements to the network.

Various embodiments of the present invention are directed to a computer program product, including a tangible, non-transitory computer readable storage medium including computer readable program code embodied therein. The computer readable program code includes computer readable code to transmit, to a network, an indication including beam information defining beams that are suitable to be used for transmitting Positioning Reference Signals, PRS, to the wireless device, computer readable code to receive, from the network, control signaling including PRS scheduling information for upcoming transmission of the PRS in beams, computer readable code to perform measurements on the PRS based on the PRS scheduling information that was received, and computer readable code to provide the measurements to the network.

Various embodiments of the present invention are directed to an electronic device used in a wireless communication system, the wireless electronic device including a processor and a memory coupled to the processor, the memory including computer readable program code embodied therein that, when executed by the processor, causes the processor to perform operations including receiving, from the UE, an indication including beam information defining beams that are suitable to be used for Positioning Reference Signals, PRS, to the UE, transmitting, to the UE, control signaling including PRS scheduling information for upcoming transmission of the PRS based on the received beam information that was received, triggering transmission of the PRS to the UE, and receiving, from the UE, measurements including position information of the UE, based on the PRS scheduling information.

Various embodiments of the present invention are directed to a computer program product, including a tangible, non-transitory computer readable storage medium including computer readable program code embodied therein. The computer readable program code includes computer readable code to receive, from the UE, an indication including beam information defining beams that are suitable to be used for Positioning Reference Signals, PRS, to the UE, computer readable code to transmit, to the UE, control signaling including PRS scheduling information for upcoming transmission of the PRS based on the received beam information that was received, computer readable code to trigger transmission of the PRS to the UE, and computer readable code to receive, from the UE, measurements including position information of the UE, based on the PRS scheduling information.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

DETAILED DESCRIPTION

Figure 1:
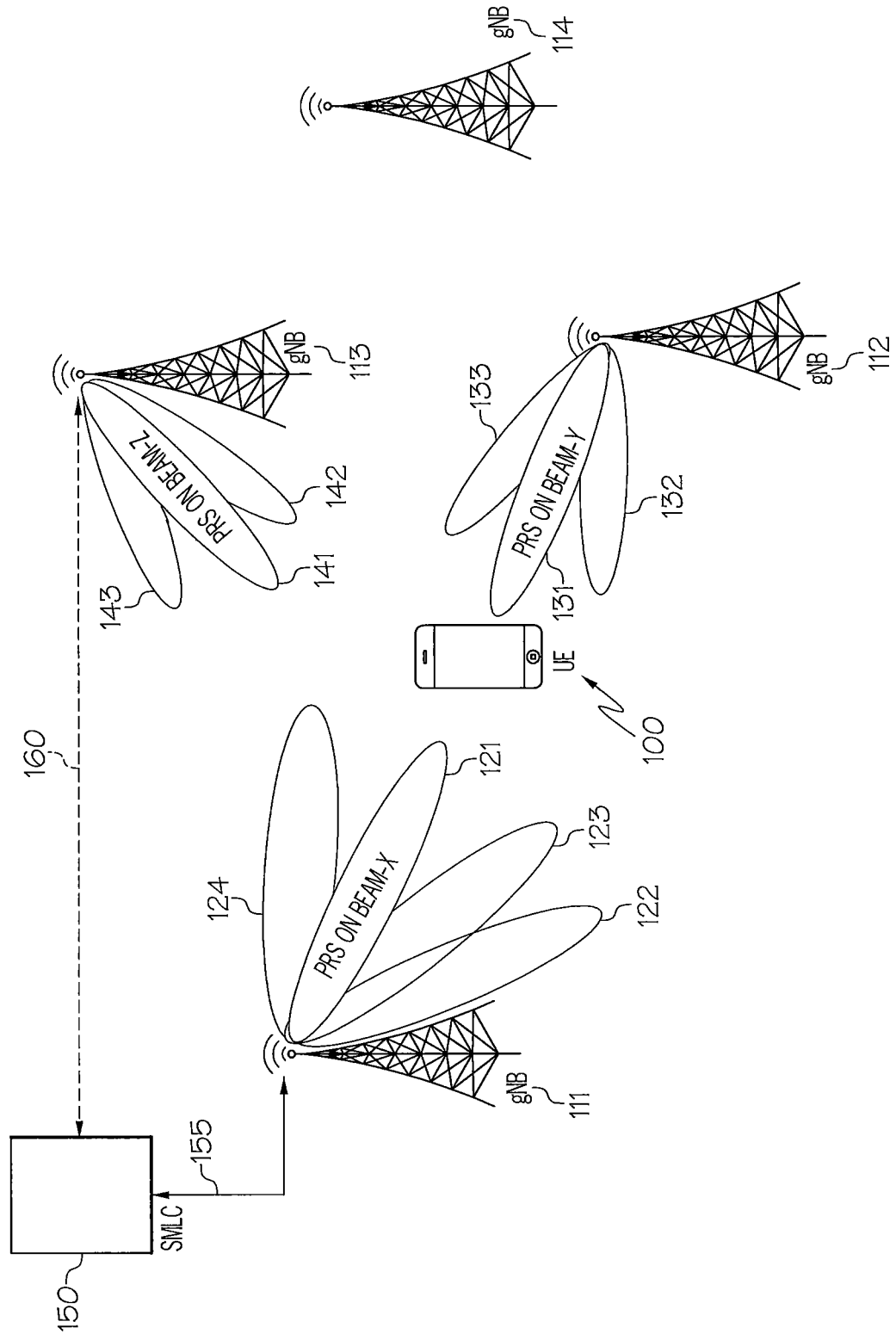
FIG. 1 illustrates a wireless communication system, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Observed Time Difference of Arrival (OTDOA) is a Radio Access Technology (RAT) dependent positioning technique, which has been widely deployed in LTE networks. When using OTDOA, the device or user equipment (UE) may receive reference signals from multiple eNodeBs (eNBs) and then perform timing difference of arrival (TDOA) measurements. The measurement results may be transmitted using the LTE positioning protocol (LPP) from a UE to a location server (LS) via a base station, such as an eNodeB (eNB). The location server may perform positioning estimation or triangulation based on information from at least three eNodeBs. As used herein, the term "network" may include any entity in a wireless network other than a UE, such as a positioning node, positioning server, location server, which may include, for example SMLC or eSMLC, and a base station, eNB, and/or a gNB. As used herein the base station may include a network element in communication with one or more UEs. In LTE technology, the base station may be referred to as an eNB and in 5G NR technology, the base station may be referred to as a gNB, but use of the term "base station" is not limited to the aforementioned technologies.

Positioning reference signals (PRS) are reference signals used in LTE networks to assist with determining UE positioning using OTDOA techniques. PRS may be used by a UE to estimate time of arrival (TOA) of signals. Determining the TOA of signals from each base station may occur when the UE receives reference signals, such as PRS, and then perform cross-correlation with locally generated reference signals. Cross-correlation from different transmission antennas, receiver antennas, and/or sub-frames may be accumulated or aggregated, such that a suitable cross-correlation peak is obtained. The measured time delay may be obtained from the phase information of the cross-correlation peak. Using reference signals, cross-correlation may be performed multiple times to obtain the time delay from several eNodeBs, such as a reference base station and/or neighbor base stations. A Reference Signal Time Difference (RSTD) measurement may be obtained by subtracting the time delay of a neighbor eNodeB from the time delay of a reference base station or a serving base station. The UE may judge and classify the RSTD measurement quality. The UE may send the RSTD measurements and the RSTD measurement quality to the location server.

In LTE, the PRS may be transmitted by the base station, assuming that the base station has an omni-directional and/or sector antenna. However, there may not be an indication of the beam of the antenna that is being used for PRS transmission in LTE. Similarly, the UE may be expected to use omni-directional or relatively wide antenna receive beams in LTE. The UE may be expected to receive the PRS signal, as long as the UE is within the cell range.

In 5G NR systems, the base station and/or the UE may deploy with multibeam operation. For example, the synchronization signal block (SSB) in NR may be operated with up to 64 narrow beams. Beams are typically transmitted using a beam sweep in order to cover the whole cell coverage, where the beams are transmitted consecutively in time. Thus, the PRS would be transmitted at different points in time in the different beams. In other words, the PRS would be swept along with the beams. Thus, each individual UE may receive the PRS of one or several of the beams from each base station or gNodeB (gNB). The PRS of different beams may be transmitted at different points in time.

Due to the maturity of OTDOA positioning based in LTE, a similar approach may be adopted for 5G NR positioning. However, NR has different scenarios and various new features, such as wider bandwidth, multiple beam operation, operating at higher frequencies, etc. Thus, some adaptations may be needed to obtain higher positioning accuracy, for example, using beam-based broadcast PRS transmission.

Various embodiments described herein may arise from the recognition that improved methods for beam sweeping to select beams for wireless communication between devices are needed to reduce signaling overhead and/or to reduce latency of data transfers between devices. In some techniques, consecutive PRS transmissions in multiple narrow beams may ensure that the gNB covers the whole cell coverage. However, this operation could increase latency and increase resource utilization. 5G NR is expected to support stringent positioning requirements on latency and accuracy and may need to support various use cases using drones or other moving objects. Thus, according to various embodiments described herein, on-demand positioning may be a potential solution to overcome latency issues, reduce resource utilization, reduce interference, and/or achieve 5G positioning targets. The on-demand positioning may be used to complement the OTDOA positioning.

According to various embodiments described herein, on-demand positioning may be used when the base-station and/or the UE are equipped with an antenna system that supports multiple antenna beams for transmitting and receiving signals. A UE may perform positioning measurements at a specific time, such as when there is a request from the network, from an authority such as police, or when the UE makes an emergency call. When an emergency call is made, it may trigger a demand for positioning information. The base-station may transmit a positioning reference signal in a beam that is selected based on being suitable for the communication based on conditions or one that is being used for communication with the base station. A reporting mechanism may be used from the UE to the network based on beam and/or cell information. The network may order the base-station to transmit PRS at a given time and/or on a specific beam. The on-demand positioning may be triggered asynchronously, i.e. not based on a periodic location information request. Using PRS on demand improves the usage of resources since the PRS transmissions may be triggered upon request, and intelligent selection of beams may be employed. In some embodiments, on-demand PRS resources may be allocated immediately after legacy or other non-on-demand PRS resources. For example, PRS resources may be transmitted periodically every 1 second, with a duration of 20 msec. On-demand PRS may be transmitted consecutively after the 20 msec PRS interval. In other words, some embodiments may include transmitting on-demand PRS resources immediately following non-on-demand PRS resources.

Various embodiments described herein support the operation of on-demand positioning. FIG. 1 illustrates a wireless communication system that includes a UE and various gNBs. Referring to FIG. 1, gNBs 111, 112, 113, and/or 114 may be base stations in a wireless communication system. The gNB 111 may have antennas that can use beams 121, 122, 123, and/or 124 in a cell including UE 100. The gNB 112 may have antennas that can use beams 131, 132, and/or 133 in a cell including UE 100. The gNB 113 may have antennas that can use beams 141, 142, and/or 143 in a cell including UE 100. The gNB 114 may not have beams that transmit in the vicinity of UE 100 or beams that are of poor signal quality at the UE 100. As such, PRS may not be transmitted from gNB 114 to UE 100. On-demand positioning measurements may be based on selected cells associated with gNB 111, gNB 112, and/or gNB 113 and respectively associated beams 121, 131, and 141. Beams 121, 131, and/or 141 may be selected based on criteria such as beams that mitigate the interference between devices, improve the signal-to-interference and/or signal-to-noise ratios, and/or have higher signal strength at the receiver. For a given UE, PRS may not be activated if suitable beams are not available for the UE. Thus, a limited number of PRS on a corresponding limited number of beams are activated, reducing use of resources and improving network latency since stronger, reliable beams are used for PRS.

In some embodiments, network nodes such as a positioning server, Service Mobile Location Center (SMLC) 150 or an enhanced-SMLC (e-SMLC) may indicate to the UE 100 to provide and/or update positioning related information. This indication from the SMLC 150 may be useful in cases where an authority such as police, fire, or medical personnel need to know the position and/or want to track a position of the UE 100. UE 100 may provide information to the network, including the SMLC 150 and/or gNB 111, 112, 113. Information provided by the UE 100 may include suitable selected cells and/or beams of surrounding cells in order to enable the corresponding base stations or gNBs to transmit PRS using the reported beam directly to the network. The indication and the information may be sent via higher layer protocol, such as the LTE Positioning Protocol (LPP). The SMLC/e-SMLC 150 may be typically located in the core network. The SMLC and/or e-SMLC 150 may communicate 155 to a base station using the LTE Positioning Protocol A (LPPa) or communicate directly 160 to the UE using the LPP protocol. In other words, the UE may provide information regarding selected cells and/or beams to the SMLC/e-SMLC using the LPP protocol.

Communication between the SMLC 150 and the UE 100 may be relayed by a gNB 111, 112 and/or 113. For example, gNB 113 may relay the communication 160 but the gNB is not aware of the context of the data. In other words, the gNB relays the communication that is directly between the SMLC 150 and the UE 100. In some embodiments, the UE 100 may not need to take care of the beam selection at the gNB since the gNB can handle the beam selection. For communications carrying LPP protocol payload, the SMLC 150 does not need to worry about the beam selection since the gNB 111, 112 and/or 113 would be responsible for beam selection. Selecting cells and/or beams of surrounding cells for use between gNBs 111, 112 and/or 113 and the UE 100 may be a prerequisite to PRS transmission.

In some embodiments, on-demand PRS communication between the UE and the SMLC may be triggered by the UE, such as, for example, when the user of a UE makes an emergency call such as a 911 call or a 112 call. The network, such as the SMLC, may schedule and/or configure the PRS to be transmitted based on information received from the UE. A positioning server, such as an SMLC, may order base stations such as gNBs to transmit a configured PRS on a specific beam and at a specific time.

A serving base station may indicate to the UE 100 information regarding the scheduling of PRS transmission. This scheduling information may include time and/or frequency) for the PRS transmission. The PRS transmission may be a one-time transmission and/or semi-persistent transmission. The UE may request semi-persistent PRS transmission in cases where the UE 100 is mobile and thus may need to send a number of position measurements to establish speed and/or direction of travel. The PRS scheduling information may include beam and/or time resources that are sent to the UE directly from the SMLC or from one or more gNBs. Base stations, such as gNBs, may transmit on-demand PRS using dedicated resources and/or using resources that overlap with the regular PRS that is different from on-demand PRS.

Once the positioning procedure has been established, UE 100 may report the beam measurement directly to the base-station. Beam measurement may be based on the existing measurement in NR, such as Reference Signal Received Power (RSRP) measurement. In cases for which semi-persistent is needed, beams may be changed for subsequent measurement reports. In some embodiments, the measurement report may be sent to SMLC. The SMLC may trigger the base station or gNB to update the beam used for PRS transmission with the UE.

Figure 2:
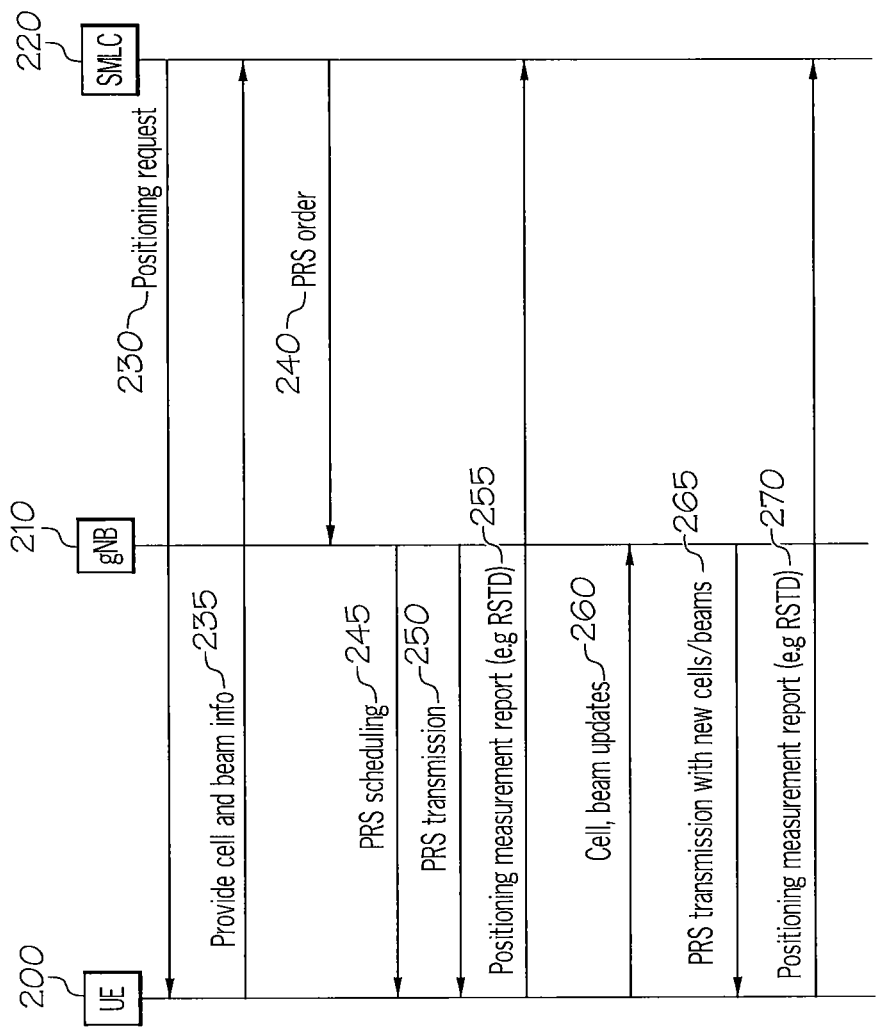
FIGS. 2 and 3 are signal flow diagrams, according to various embodiments described herein.

FIG. 2 is a signal flow diagram that illustrates various signal transmissions for on-demand positioning, according to various embodiments described herein. Referring now to FIG. 2, UE 200 may communicate with gNB 210 and/or with SMLC 220. Although FIG. 2 is discussed in the context of an SMLC, the inventive concepts may be applied to a positioning node, positioning server, and/or and E-SMLC. A positioning request 230 may be sent from SMLC 230 to UE 200. UE 200 may provide cell and/or beam information 235 to SMLC 220. A PRS order 240 may be sent from SMLC 220 to UE 200. PRS scheduling information 245 may be sent from gNB 210 to UE 200. A PRS transmission 250 may be sent from gNB 210 to UE 200. UE 200 may send a positioning measurement report 255, such as Received signal time difference (RSTD), to SMLC 220. UE 200 may send cell and/or beam updates 260 to gNB 210. A PRS transmission with new cells and/or beams 265 that have been updated may be sent from gNB 210 to UE 200. UE 200 may provide updated cell and/or beam information 270 to SMLC 220.

Figure 3:
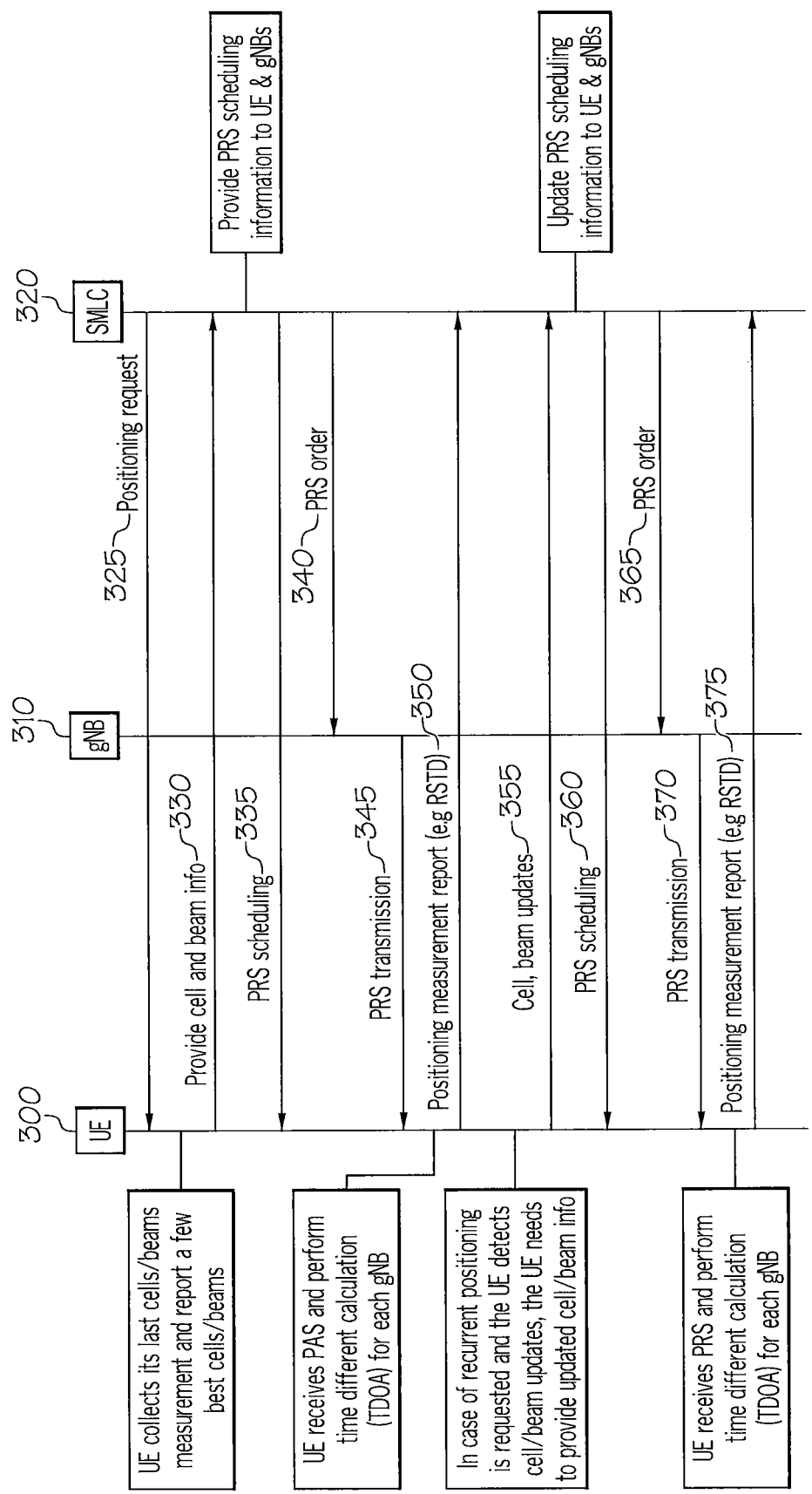

FIG. 3 is a signal flow diagram that illustrates various signal transmissions for on-demand positioning, according to various embodiments described herein. Referring now to FIG. 3, UE 300 may communicate with gNB 310 and/or with SMLC 320. A positioning request 325 may be sent from SMLC 330 to UE 300. UE 300 may collect recent cell and/or beam measurements and report suitable cells and/or beams of the collected measurements to SMLC 320. UE 300 may provide this cell and/or beam information 330 to SMLC 320. SMLC 320 may provide PRS scheduling information to UE 300 and/or gNB 310. PRS scheduling information 335 may be sent from SMLC 320 to UE 300. A PRS order 340 may be sent from SMLC 320 to gNB 310. A PRS transmission 345 may be sent from gNB 310 to UE 300. UE 300 may receive the PRS and perform time difference calculations, such as TDOA, for one or more gNB 310. UE 300 may send a positioning measurement report 350, such as Received signal time difference (RSTD), to SMLC 320. In a case of recurrent positioning being requested and/or if the UE detects cell and/or beam updates, the UE 300 may need to provide updated cell and/or beam information to SMLC 320. UE 300 may send cell and/or beam updates 355 to SMLC 320. SMLC 320 may update PRS scheduling based on the cell and/or beam updates and notify the gNB 310 and/or UE 300. PRS scheduling information 360 that includes new cells and/or beams that have been updated may be sent from SMLC 330 to UE 300. A PRS order 365 may be sent using the updated PRS scheduling information from SMLC 320 to gNB 310. A PRS transmission 370 may be sent from gNB 310 to UE 300. UE 300 may receive the PRS based on the updated PRS scheduled resources and perform time difference calculations, such as TDOA, for one or more gNB 310. UE 300 may send a positioning measurement report 375, such as Received signal time difference (RSTD), to SMLC 320.

Figure 4:
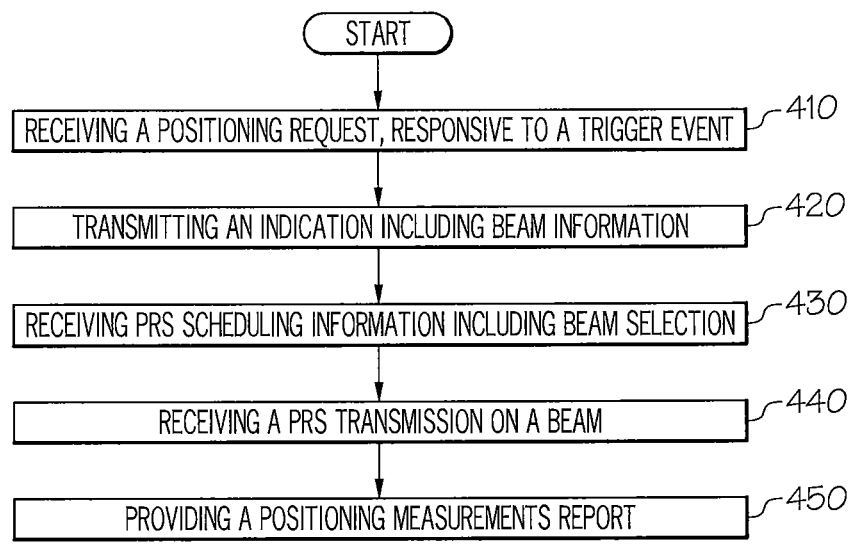
FIGS. 4 to 19 are flowcharts of operations for on-demand positioning, according to various embodiments described herein.

FIG. 4 to FIG. 11 are flowcharts of operations for on-demand position determination of a UE, including operations by the UE 100 of FIG. 1, UE 200 of FIG. 2, and/or UE 300 of FIG. 3. Referring now to FIG. 4, an indication may be transmitted, to a network, at block 420. The indication may include beam information defining beams that are suitable to be used for transmitting Positioning Reference Signals, PRS, to the wireless device. In a cell, a base station may sweep various beams over a geographical area served by the base station. A UE may receive signals in one or more beams from the base station. Moreover, when located in a certain geographical area the UE may receive beam sweeps from a plurality of base stations. A UE may receive beam sweeps from a plurality of base-stations, but there may be a stronger beam from the serving cell or in a cell in which the UE is camping in an Idle mode. These base stations may not have synchronization between one another in terms of the beam sweeps. The UE may take measurements of beams from various base stations and determine one or more suitable beams to use in communication with one or more base stations based on a variety of factors such are signal strength, signal to noise ratio, error rates, etc. Information regarding suitable beams may be shared by the UE with the network, i.e. one or more elements in the wireless network. A network node in the network may include a base station, gNB, positioning server, SMLC, or other networking elements. The network, including a positioning server and/or one or more gNBs may use information provided by the UE regarding the beams from different base stations at the UE to determine scheduling of beams and/or cells for sending PRS.

Still referring to FIG. 4, PRS scheduling information for upcoming transmission of the PRS may be received by the UE from the network, at block 430. The PRS scheduling information may include information indicating a cell and/or a beam in which the PRS is transmitted. The PRS scheduling information may indicate a subset of beams in which PRS are transmitted. The beams may have directions corresponding to at least a portion of a plurality of configurable beam directions of the base station. Typically the PRSs are only scheduled in a subset of the beam directions that base station may configure. For example, the PRS are only scheduled in beams that are directed in the direction of the UE. These directions may be determined based on the beam information received from the UE. The PRS scheduling information may include a time and/or a frequency to use the beam associated with the beam selection. In some embodiments, the PRS scheduling information may include a time and/or a frequency in which PRS is transmitted. A PRS transmission may be received on a beam associated with beam selection by the network. The beam selection may be performed by the network taking into consideration beam information from the UE. However, the network, in consideration of resources, coordination between base stations, power considerations, etc. may not use the beams suggested by the UE. Based on the PRS scheduling by the network, PRS may be sent to the UE as needed, using a subset of available beams in particular cells, thus saving resources and improving efficiency of PRS transmission by using the on-demand positioning techniques described herein.

Measurements may be performed on the PRS based on the PRS scheduling information that was received, at block 440. The UE may use the PRS scheduling information to select a beam from a given base station and to perform measurements of PRS in selected beam. The measurements may include Observed Time Difference of Arrival (OTDOA) measurements. The measurements may be provided to the network, at block 450. In some embodiments, a positioning measurement report may be provided responsive to the receiving the PRS transmission. The positioning measurement report may include the position information of the UE. The position information of the UE may be based on the OTDOA or based on Reference Signal Time Different Measurement (RSTD) information derived from the OTDOA. The PRS may be received from one or more base stations, responsive to a PRS order from a positioning node, using a given beam that is suitable to be used for transmitting PRS, at a given time.

Figure 5:
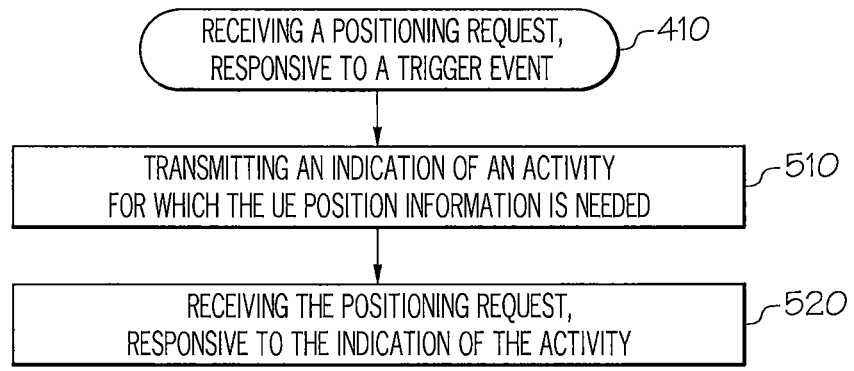

Referring now to FIG. 5, performing measurements on the PRS, at block 440, may include performing Observed Time Difference of Arrival, OTDOA, measurements based on the PRS, at block 510. Reference Signal Time Different Measurement, RSTD, information, based on the OTDOA measurements, may be communicated by the UE, at block 520.

In some embodiments, receiving a positioning request by the UE may be responsive to a trigger event. An indication of an activity for which the UE position information is needed may be transmitted. For example, when a user makes an emergency call, such as a 911 call or a 112 call, a positioning request may be triggered based on this emergency call activity. The positioning request may be received responsive to the indication of the activity. The trigger for the positioning information of the UE may originate at the UE or may originate in the network, such as, for example, at a positioning server or at a base station.

Figure 6:
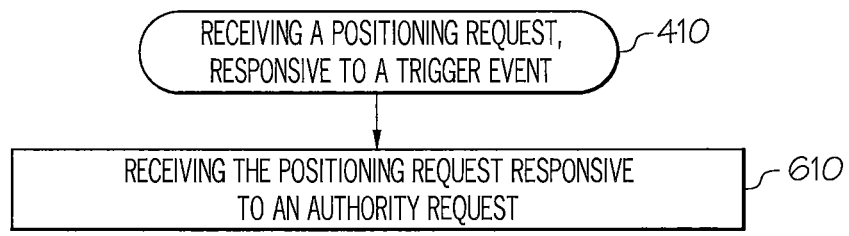

Referring now to FIG. 6, prior to the transmitting the indication that includes beam information from the UE, a positioning request may be received from the network, responsive to a trigger event, at block 610. The positioning request may be received responsive to an authority request. The authority request may be received from a government or medical agency such as police, fire, ambulance, emergency, and/or disaster relief agencies. The trigger event may be originated at the UE or may be originated at the network. For example, if a user of a UE makes an emergency call, the network may process the emergency and subsequently trigger a positioning request that is sent to the UE.

Figure 7:
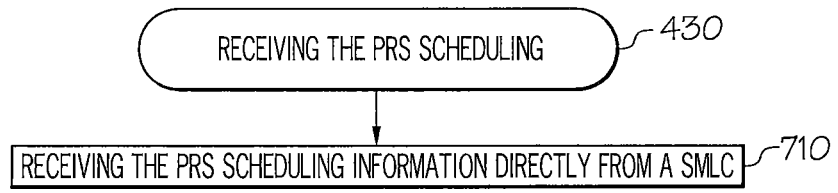
Figure 8:
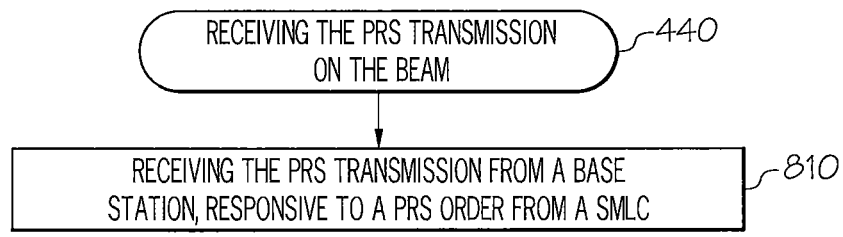

Referring now to FIG. 7, receiving the control signaling including PRS scheduling information at block 430 may include receiving the PRS scheduling information from a positioning node using the LTE positioning protocol (LPP), at block 710. In some embodiments, the PRS scheduling information may be received by a UE directly from a SMLC. In some embodiments, the PRS scheduling information may be received by a UE through a base station that may behave as a relay for the PRS scheduling information. Referring now to FIG. 8, receiving the PRS transmission on the beam at block 440, may include receiving the PRS transmission from a base station, responsive to a PRS order from a SMLC, at block 810.

Figure 9:
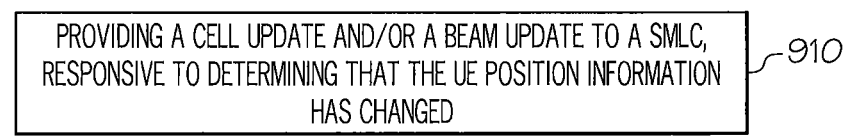
Figure 10:
Figure 11:
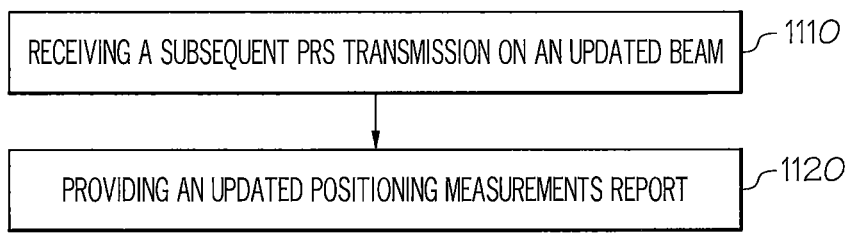

Referring to FIG. 9, some embodiments may include providing an update to a positioning node, responsive to determining that the UE position information has changed, at block 910. The update may include providing an update regarding cell information and/or an update regarding beam information. Referring to FIG. 10, some embodiments may include receiving updated PRS scheduling information, at block 1010. Additional control signaling including updated PRS scheduling information may be received from the network, responsive to the providing the update. Referring to FIG. 11, some embodiments may include receiving a subsequent PRS transmission on an updated beam, at block 1110, and may include providing an updated measurements and/or UE position information, at block 1120.

Figure 12:
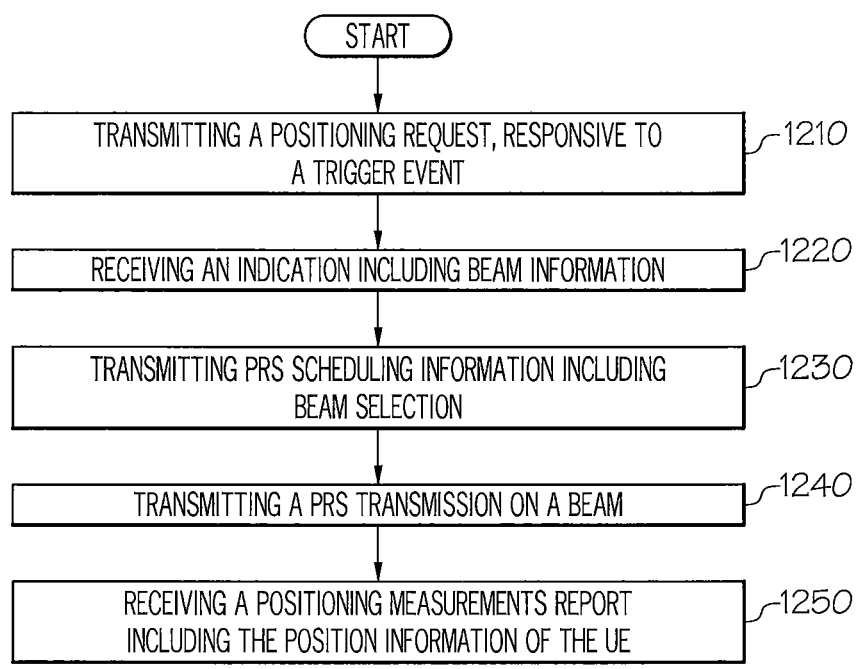

FIG. 12 to FIG. 19 are flowcharts of operations for on-demand position determination of a UE, including operations performed by a network such as gNBs 111, 112, and/or 113 of FIG. 1, gNB 210 of FIG. 2, SMLC 220 of FIG. 2, gNB 310 of FIG. 3, and/or SMLC 320 of FIG. 3. Referring now to FIG. 12, the network may receive, from a UE, an indication including beam information defining beams that are suitable to be used for PRS to the UE, at block 1210. The network may transmit, to the UE, control signaling including PRS scheduling information for upcoming transmission of the PRS based on the beam information that was received, at block 1220. However, the PRS scheduling may be adapted to be suitable for a given UE, based on factors such as a trigger received by the network or coordination across the network. In some embodiments, once a positioning node or a positioning server receives information from the UE, the positioning node may send a PRS order to one or more gNBs. The UE may also receive the on-demand scheduling information. Thus, the UE becomes aware of particular base-stations and/or times that PRS is transmitted such that the UE may be ready to receive the PRS. This awareness by the UE improves efficiency by the UE since the UE receiver may be actively listening for PRS at the configurable PRS schedule and/or on particular on-demand beams. For example, the configurable PRS schedule may include an on-demand time for using particular on-demand beams. In some embodiments, the PRS scheduling information may include cell information, such as cell Id, in which to use a given beam, identified by a beam Id, associated with the beam selection. The PRS scheduling information may include a time and/or a frequency to use the beam associated with the beam selection. Beam selection for PRS scheduling may be performed by the network taking into consideration beam information from the UE. However, the network, in consideration of resources, coordination between base stations, power considerations, etc. may not use one or more of the beams suggested by the UE.

Still referring to FIG. 12, the network may trigger transmission of the PRS to the UE, at block 1230. For example, an SMLC may send a request to the concerned base stations of the concerned cells, such as described in FIG. 3, step 340. The network may receive, from the UE, measurements on the PRS that was transmitted to the UE, at block 1240. In some embodiments, the network may receive, from the UE, measurements including position information of the UE, based on the PRS scheduling information. Operations by the network may include sending PRS on a beam indicated by the PRS scheduling information, to the UE. The PRS may be transmitted by a base station, responsive to a PRS order from the positioning node, using a given beam that is suitable to be used for transmitting PRS, at a given time. The network may receive a positioning measurements report including the position information of the UE. In some embodiments, the measurements received by the network may include Observed Time Difference of Arrival (OTDOA) measurements. The position information from the UE may be based on the OTDOA or based on Reference Signal Time Different Measurement (RSTD) information derived from the OTDOA.

Figure 13:
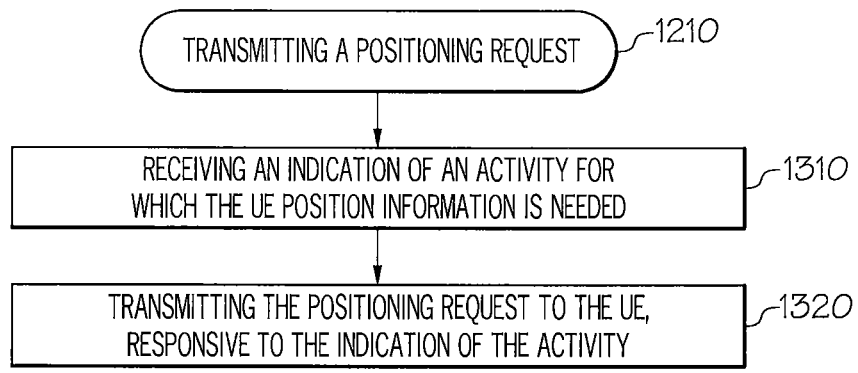

Referring to FIG. 13, the network may receive an indication of an activity for which the UE position information is needed, at block 1310. The network may transmit a positioning request to the UE, responsive to the indication of the activity, at block 1320. In some embodiments, a positioning request may be transmitted responsive to a trigger event such as an authority request from an authority such as police, or when the UE makes an emergency call.

Figure 14:
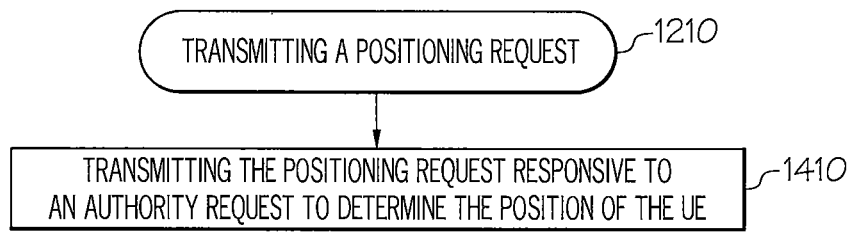
Figure 15:
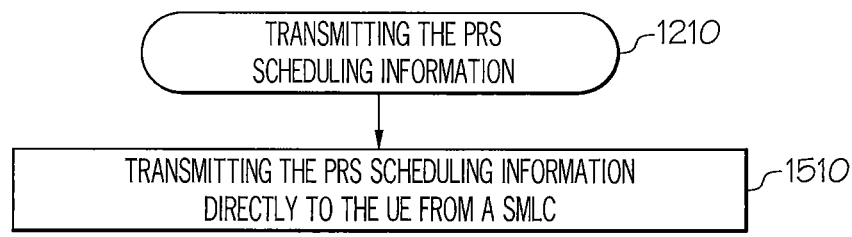

Referring to FIG. 14, the network node may transmitting a positioning request to the UE, responsive to an authority request, at block 1410. Referring to FIG. 15, the network may transmit, prior to the transmitting the PRS scheduling information, a positioning request, responsive to a trigger event, at block 1510. In some embodiments, the PRS scheduling information may be transmitted directly to the UE from a SMLC. In some embodiments, the PRS scheduling information may be sent by the network to a UE through a base station that may behave as a relay for the PRS scheduling information.

Figure 16:
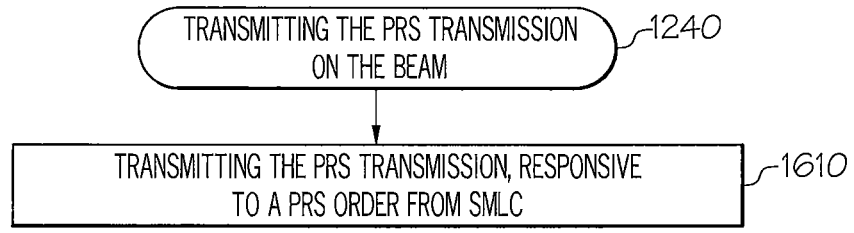
Figure 17:
Figure 18:

Referring now to FIG. 16, the network may transmit the PRS scheduling information to the UE from a positioning node using LTE positioning protocol, LPP, at block 1610. In some embodiments, the PRS transmission on a selected beam may be responsive to a PRS order from the SMLC. Referring now to FIG. 17, in some embodiments, operations may include receiving an update from a UE, at block 1710. The update may provide an update of a cell Id or a beam Id, responsive to determining that the UE position information has changed. Referring now to FIG. 18, the network may transmit additional control signaling including updated PRS scheduling information, responsive to receiving the update, at block 1810. Updated PRS scheduling information may include an updated beam selection and/or an updated cell information, responsive to receiving an update of the cell and/or the beam for use in communication with the UE.

Figure 19:
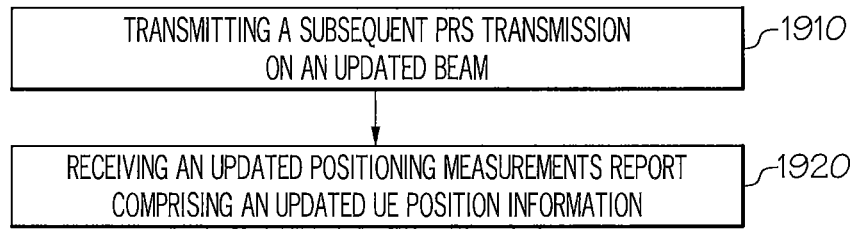

Referring now to FIG. 19, in some embodiments, operations by the network may include transmitting a subsequent PRS transmission on an updated beam, at block 1910, and receiving an updated positioning measurements report including an updated UE position information, at block 1920.

Figure 20:
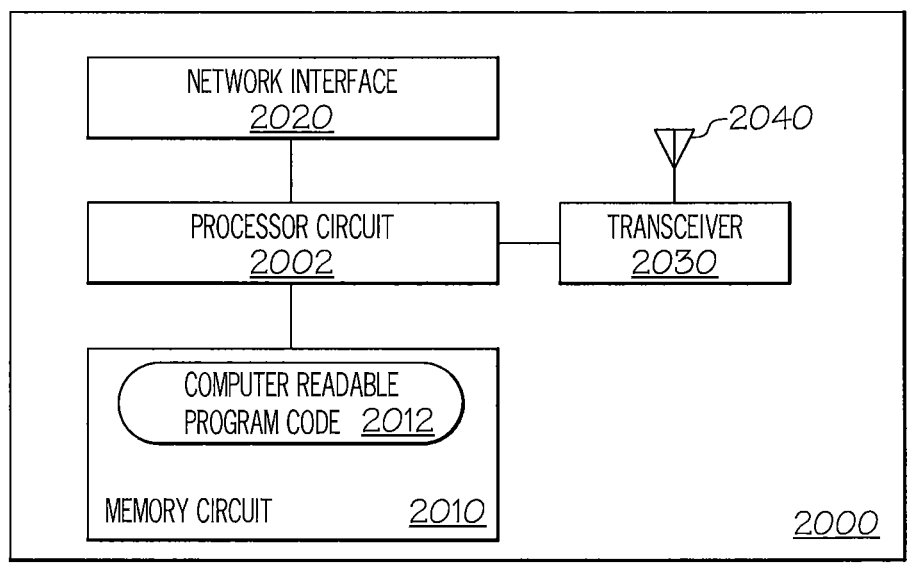
FIGS. 20 and 21 are block diagrams of devices for on-demand positioning, according to various embodiments described herein.

FIG. 20 is a block diagram of a device 2000, such as UE 100 of FIG. 1, UE 200 of FIG. 2, and/or UE 300 of FIG. 3, that is configured according to one or more embodiments disclosed herein. The device 2000 may include a transceiver 2030, one or more antennas 2040, a network interface 2020, a processor circuit 2002, and a memory circuit 2010 containing computer readable program code 2012.

The transceiver 2030 is configured to communicate with a network node such as gNBs 111, 112, and/or 113 of FIG. 1, gNB 210 of FIG. 2, SMLC 220 of FIG. 2, gNB 310 of FIG. 3, and/or SMLC 320 of FIG. 3, using one or more of the radio access technologies. The processor circuit 2002 may include one or more data processing circuits, such as a general purpose and/or special purpose processor, e.g., microprocessor and/or digital signal processor that may be collocated or distributed across one or more networks. The processor circuit 2002 (also referred to as a processor) is configured to execute the computer readable program code 2012 in the memory 2010 to perform at least some of the operations and methods of described herein as being performed by the device 2000. For example, processor 2002 may be configured to perform operations discussed above with respect to FIGS. 2-11. The network interface 2020 communicates with other devices 2000, base station, gNB, positioning server, and/or an SMLC.

Figure 21:
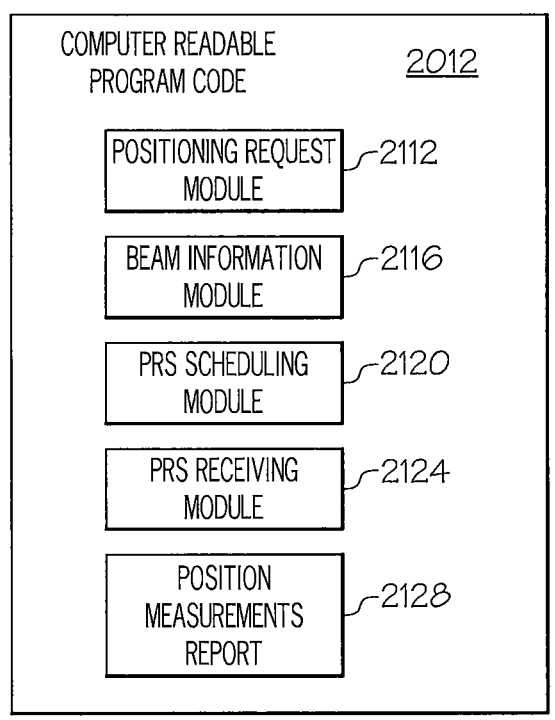

FIG. 21 illustrates the computer readable program code 2012 in more detail. In particular, the computer readable program code 2012 includes a positioning request module 2112, a beam information module 2116, a PRS scheduling module 2120, a PRS receiving module 2124, and/or a position measurement module 2128.

Various embodiments described herein provide on-demand positioning information related to UEs. According to various embodiments, the UE may demand specific PRS transmissions including specific antenna beams and/or base stations related to specific beams. Signaling of PRS on-demand related information including cell and/or beam info between UE and SMLC is provided, according to various embodiments. PRS scheduling based on UE preferences, as in PRS on-demand information is provided. A PRS transmission order to a gNB using LPPa protocol from the SMLC is described. The embodiments described herein provide efficient use of time/frequency/beam resources in a wireless communication network.

Further Definitions:

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

The invention claimed is:

1. A method, performed in a wireless device, for obtaining position information of user equipment (UE) in a wireless communication system, the method comprising:
   transmitting, to a Service Mobile Location Center (SMLC), an indication comprising beam information defining beams that are suitable to be used for transmitting Positioning Reference Signals (PRS) to the wireless device, for determination of PRS scheduling information by the SMLC based on the beam information from the wireless device;
   receiving, from the SMLC, the PRS scheduling information for upcoming transmission of the PRS from a base station;
   performing measurements on the PRS based on the PRS scheduling information that was received; and
   providing the measurements to the SMLC,
   wherein the SMLC is remotely located from the base station.

2. The method of claim 1, wherein the PRS scheduling information comprises information indicating cells and beams in which PRS is transmitted.

3. The method of claim 1, wherein the PRS scheduling information further comprises a time and/or a frequency in which PRS is transmitted.

4. The method of claim 1, wherein the PRS are received from one or more base stations, responsive to a PRS order from a positioning node, using a given beam that is suitable to be used for transmitting PRS, at a given time.

5. The method of claim 1, wherein the performing measurements on the PRS comprises:
   performing Observed Time Difference of Arrival (OTDOA) measurements based on the PRS; and
   communicating Reference Signal Time Different Measurement (RSTD) information based on the OTDOA measurements.

6. The method of claim 1, further comprising:
   receiving, prior to the transmitting the indication, a positioning request from the base station, responsive to a trigger event.

7. The method of claim 1, wherein the receiving the PRS scheduling information comprises:
   receiving the PRS scheduling information from a positioning node, using LTE positioning protocol, LPP.

8. The method of claim 1, further comprising:
   providing an update to a positioning node responsive to determining that the position information of the UE has changed, wherein the update comprises to an update to a cell and/or a beam.

9. The method of claim 8, further comprising:
   receiving, from the base station, additional control signaling comprising updated PRS scheduling information, responsive to the providing the update.

10. The method of claim 9, further comprising:
receiving subsequent PRS signals on an updated beam associated with the updated PRS scheduling information; and
providing updated measurements comprising an updated UE position information, responsive to the receiving the subsequent PRS signals.

11. A method, performed in a Service Mobile Location Center (SMLC), for obtaining position information of user equipment (UE) in a wireless communication system, the method comprising:
receiving, from the UE, an indication comprising beam information defining beams that are suitable to be used for Positioning Reference Signals (PRS) for the UE;
determining, by the SMLC, PRS scheduling information for upcoming transmission of the PRS based on the beam information that was received;
transmitting, to the UE via a base station, the PRS scheduling information for upcoming transmission of the PRS based on the beam information that was received;
triggering transmission of the PRS to the UE; and
receiving, from the UE, measurements on the PRS that was transmitted to the UE,
wherein the SMLC is remotely located from the base station.

12. The method of claim 11, wherein the PRS scheduling information comprises information indicating one or more cells and one or more beams in which PRS is transmitted.

13. The method of claim 11, wherein the PRS are transmitted by a base station, responsive to a PRS order from a positioning node using a given beam that is suitable for transmitting PRS, at a given time.

14. The method of claim 11, wherein the transmitting the PRS scheduling information comprises:
transmitting a positioning request to the UE, responsive to an authority request.

15. The method of claim 11, further comprising:
transmitting, prior to the transmitting the PRS scheduling information, a positioning request, responsive to a trigger event.

16. The method of claim 11, wherein the transmitting the PRS scheduling information comprises:
transmitting the PRS scheduling information to the UE from a positioning node using LTE positioning protocol, LPP.

17. The method of claim 11, further comprising:
receiving an update from a UE, the update comprising updated information associated with a cell and/or a beam.

18. The method of claim 17, further comprising:
transmitting, additional control signaling comprising updated PRS scheduling information, responsive to receiving the update.

19. The method of claim 18, further comprising:
transmitting subsequent PRS on an updated beam associated with the updated PRS scheduling information; and
receiving updated measurements comprising an updated UE position information, responsive to the transmitting the subsequent PRS.

20. A wireless electronic device used in a wireless communication system, the wireless electronic device comprising:
a processor; and
a memory coupled to the processor, the memory comprising computer readable program code embodied therein that, when executed by the processor, causes the processor to perform operations comprising:
transmitting, to a Service Mobile Location Center (SMLC), an indication comprising beam information defining beams that are suitable to be used for transmitting Positioning Reference Signals (PRS) to the wireless electronic device, for determination of PRS scheduling information by the SMLC based on the beam information from the wireless electronic device;
receiving, from the SMLC, the PRS scheduling information for upcoming transmission of the PRS from a base station;
performing measurements on the PRS based on the PRS scheduling information that was received; and
providing the measurements to the SMLC,
wherein the SMLC is remotely located from the base station.

* * * * *

UNITED STATES PATENT AND TRADEMARK OFFICE
CERTIFICATE OF CORRECTION

| | | |
|---|---|---|
| PATENT NO. | : 11,576,008 B2 | Page 1 of 1 |
| APPLICATION NO. | : 17/272794 | |
| DATED | : February 7, 2023 | |
| INVENTOR(S) | : Priyanto et al. | |

It is certified that error appears in the above-identified patent and that said Letters Patent is hereby corrected as shown below:

On the Title Page

(22) PCT Filed: Please correct "Jul. 21, 2019" to read --Aug. 21, 2019--

Signed and Sealed this
Sixth Day of June, 2023

*Katherine Kelly Vidal*

Katherine Kelly Vidal
*Director of the United States Patent and Trademark Office*